United States Patent [19]
Rowell et al.

[11] Patent Number: 5,675,414
[45] Date of Patent: Oct. 7, 1997

[54] SILICON COATED MYLAR BEAMSPLITTER

[75] Inventors: Nelson L. Rowell; Edward A. Wang, both of Ottawa, Canada

[73] Assignee: National Research Council of Canada

[21] Appl. No.: 692,111

[22] Filed: Aug. 5, 1996

Related U.S. Application Data

[63] Continuation-in-part of Ser. No. 352,026, Nov. 30, 1994, Pat. No. 5,558,934.

[51] Int. Cl.$^6$ .................... G01B 9/02; G02B 1/10
[52] U.S. Cl. .............. 356/346; 356/345; 359/634; 359/583
[58] Field of Search ............... 356/346, 345; 359/350, 629, 634, 583

[56] References Cited

U.S. PATENT DOCUMENTS 5,587,831  12/1996  Simon et al. .................... 359/634

Primary Examiner—Frank G. Font
Assistant Examiner—Amanda Merlino
Attorney, Agent, or Firm—J. Wayne Anderson

[57] ABSTRACT

The invention disclosed relates to an interferometer for the far-infrared which provides a high operating efficiency over the spectral range of 50 to 1000 cm$^{-1}$. The beamsplitter component comprises a composite of a thin, substantially uniformly thick synthetic resin film having low far-infrared absorption, selected from polyethyleneterephthalate and polypropylene, and a thin substantially uniformly thick coating of germanium. An improved interferometer including a beamsplitter formed of the composite is also disclosed.

12 Claims, 17 Drawing Sheets

SILICON COATED MYLAR BEAMSPLITTER

This application is a Continuation-in-Part of Applicant's U.S. application Ser. No. 08/352,026 now U.S. Pat. No. 5,558,934, filed Nov. 30, 1994.

BACKGROUND OF THE INVENTION

This invention relates to infrared beamsplitters, and in particular to a composite material for use in far-infrared beamsplitter which provides for a high operating efficiency over a wide spectral range.

1. Field of the Invention

Far-infrared (FIR) spectroscopy, which involves spectral measurements in the frequency range of about 30 to 550 $cm^{-1}$, is used extensively in studies of solid-state physics.

The far-infrared Fourier Transform (FT) spectrometer is the most powerful tool in far-infrared spectroscopy. Although, in the sense of sensitivity the Fourier Transform spectrometer is a breakthrough in far-infrared spectroscopy, due to either the low optical throughput of the instrument or the low detector detectivity in the spectral range, the signal to noise ratio is still not high enough for many applications. Therefore how to improve the optical throughput of far-infrared spectrometers and eventually improve the system sensitivity is a very meaningful study.

The heart of FT spectrometer is some kind of interferometer. A Michelson type interferometer is typically used in FT spectrometers due to its optical simplicity and mechanical advantages. A beamsplitter is part of this device.

A beamsplitter is a device that splits an incident radiation beam into two coherent parts by reflecting and transmitting some fraction of the incident beam. More specifically, the beamsplitter divides an incident, parallel beam which is incoherent and of a broad spectral bandwidth into reflected and transmitted beams at each point on a plane in the incident beam's wavefront. Hence it follows that the beamsplitter optical surface must be optically flat and uniform to approximately a tenth of the smallest wavelength in the spectral range of interest. Secondly, the beamsplitter should divide the intensity of the wavefront evenly; i.e. as close as possible to a 1-to-1 ratio for reflectance to transmittance across the relevant spectral range. Thirdly, the beamsplitter should be non-absorbing which means that the sum of its reflectance and its transmittance should be as close as possible to unity, i.e. R+T=1, in the relevant spectral range. Thus the beamsplitter efficiency for Michelson interferometers, defined as two times the product R times T, can be up to 0.50 which means that the ideal interferometer can transmit up to one-half of the incident radiation with the other half reflected back towards the radiation source. Fourthly, the beamsplitter should not be strongly polarization sensitive since, in general, the incident radiation is unpolarized. In practice, this means that the beamsplitters are used only moderately off normal incidence at a relatively small angle, typically 30°.

2. Description of the Prior Art

Current beamsplitters used in far-infrared Michelson interferometers can be divided roughly into 3 types i.e. (1) wedged thick substrate (2) wire-grid polarizing, and (3) single-layer free-standing, dielectric-film beamsplitters.

The first beamsplitter type normally employs a multilayer interference coating on one side of a thick, transparent, flat substrate with low index to minimize reflection losses from the back surface of this plate which is wedged with respect to the coated surface to separate spatially the reflections from the two surfaces. Furthermore, to compensate for the extra optical path length for the beam transmitted through the substrate compared with the reflected beam, another, oppositely wedged, uncoated plate of the same material and thickness is used above the coating. Such beamsplitters, although highly efficient, are useable only above 200 $cm^{-1}$ due to the limited choice of uniform, low absorbance substrate materials which can be polished optically flat. For example, to obtain the necessary flatness ($\lambda/8$) over the typical large diameters (12 cm) used, a relatively thick (1 cm) substrate must be used to allow for accurate optical processing. This fact require that the absorption coefficient of the substrate be much less than 0.1 $cm^{-1}$ which implies the imaginary part of the refractive index, k, at 200 $cm^{-1}$ must be much smaller that $4\times10^{-5}$. For comparison, the imaginary part of the refractive index for silicon, a relatively low absorbance material commonly used as a substrate for multilayer coated filters in the far-infrared, is approximately $2\times10^{-4}$ at 200 $cm^{-1}$ (Palik 1985)[1]; i.e. too large for conventional coated beamsplitter applications.

One approach to circumvent the problems of large absorption in the substrate is to make the substrate much thinner, an approach which Vidrine and Anderson U.S. Pat. No. 4,632,553 of 30 Dec. 1986) seem to have employed in their solid silicon beamsplitter. By using a relatively thin silicon wafer, it appears that these authors have sufficiently reduced the beamsplitter absorption and have eliminated the need for a compensator plate. Although the details are not present in their patent, it can be deduced that these authors are using their silicon wafer at approximately a 45° angle of incidence since they claim a 45% reflectance and 55% transmittance at the beamsplitter surface and such an angle is indicated in their figures. Although these authors indicate that the back surface of the wafer is wedged with respect to the front surface, they do not state whether or not the back surface is anti-reflection coated. Although such a coating would be technologically novel and very difficult to produce for the required broadband coverage (a single layer would be insufficient), it would be necessary since, in its absence, the efficiency of the device would be diminished to only 16% of the optimum efficiency for a beamsplitter. What this means is that only the modulated intensity at the detector in an interferometer using an uncoated, wedged silicon beamsplitter is only 0.08 of the intensity at the input port of the interferometer instead of the ideal 0.5. Since they did not report a coating, we can only assume that Vidrine and Anderson did not anti-reflection coat the back surface of their beamsplitter and that their device is quite inefficient.

The second type of beamsplitter employed in FT-IR spectrometers uses wire-grid, polarizing elements (Cuisenier 1992[2], Martine 1982[3], Dignam 1981[4]); i.e. the Martin-Puplett interferometer. The advantages of the wire-grid beamsplitter are purported to be (1) wide spectral range, (2) high beamsplitter efficiency, and (3) no dc offset in the interferogram. However, for an interferometer using a single detector, the polarizing beamsplitter is potentially only one-half as efficient as the ideal beamsplitter since 50% of the incident radiation is rejected by the input polarizer. to overcome this limitation, the usual approach has been to use extra polarization rotators and two detectors, one for each polarizations, whose outputs are summed electronically. As previous authors (Carli 1987[5], Cuisenier 1992[2]) indicate, the best performance for this type of system depends on the wire spacing, and, in the grids normally used, is obtained for frequencies below 150 $cm^{-1}$. Furthermore, the beamsplitter efficiency for a two-detector interferometer is typically 0.3 for frequencies up to 150 $cm^{-1}$ and lower above that frequency. Thus, it would seem that the additional complications of polarizers and an extra detector point are barely justified by the slight improvement in performance over conventional free-standing film beamsplitters at low frequencies. Hence, it appears certain that the polarizing interferometer cannot have an optimum efficiency over the whole range from 40 to 55 cm$^{-1}$.

The third type of beamsplitter uses single-layer, free standing, dielectric films as described in (Cuisenier 1992, Martin 1980[2], Kampffmeyer 1977[7]) for the far-infrared.

The present far-infrared beamsplitter using a single Mylar (trademark for a Polyethyleneterephthalate film) is essentially the same as originally introduced (Gebbie 1956)[8] although, since the, better beamsplitter performance has been obtained because of improved material quality. The advantages of Mylar include low enough absorptivity, relatively high reactive index (1.72) compared with other polymer-type films (Kampffmeyer 1977)[7], the low cost of the material, and the ease of making a beamsplitter. However, there are shortcomings in this type of beamsplitter most notably the variable beamsplitter efficiency of the device. In fact, due to interference in the film for a particular Mylar thickness, the film is like a Fabry-Perot interferometer in that there are optical frequencies at which the reflectively and beamsplitter efficiency are exactly zero. At these frequencies the particular Mylar thickness cannot be used for a beamsplitter and another thickness has to be substituted. For this reason, several Mylar beamsplitters are used to span the far-infrared spectrum. Another deficiency of Mylar beamsplitters is their modest beamsplitter efficiency which, due to the lower than optimum dielectric constant of Mylar, is less than 72% of the maximum theoretical efficiency (=0.5) that would occur with a film of 50% reflection and 50% transmission. Furthermore, this efficiency is greater than 0.25 over a narrow range of the far-infrared spectrum. With absorbing films, the efficiencies are even lower and some effects of absorption are seen for Mylar between 350 and 700 cm$^{-1}$ (Kampffmeyer 1977)[7].

SUMMARY OF THE INVENTION

It is an object of the invention to provide a composite material for use in a far-infrared beamsplitter.

It is another object of the present invention to provide a far-infrared beamsplitter of increased bandwidth in order to cover the spectral range of 50 to 550 cm$^{-1}$ with a single beamsplitter of high efficiency.

According to one aspect of the invention, a composite material for use in a far-infrared beam splitter is provided, comprising a substrate in the form of a thin, substantially uniformly thick film of a synthetic resin having low far-infrared absorption selected from the group consisting of polyethyleneterephthalate, polycarbonate, polyimide, polyvinylchloride, polypropylene and polyethylene, and a substantially uniform thickness coating of a transparent material having an index of refraction of about twice that of the substrate.

According to another aspect of the invention, an improved infrared interferometer is provided, said interferometer having a source of infrared radiation, a fixed reflector, a moving reflector and a beamsplitter for directing said infrared radiation to said reflectors, the improvement wherein the beamsplitter comprises a composite as described above having substantially optically flat leading and trailing surfaces.

Preferably, the beamsplitter is disposed such that the incident infrared radiation is directed at an angle of about 30° to the normal of the leading surface of the beamsplitter.

Several polymers, for example Mylar (polyethylene terephthalate), polycarbonate, polyimide, polyvinylchloride, polypropylene, and polyethylene, could be suitable low index substrate materials (Kampffmeyer 1977[7]), the disclosure of which is incorporated herein by reference, based on their low far-infrared absorption. There are several other requirements that have to be satisfied for a thin film to be used as a far-infrared beamsplitter which also apply when using the polymer film as the first layer in a two layer system. The film's absorption coefficient must be low enough in the far-infrared for a good beamsplitter efficiency. Mechanically the film must have sufficient elasticity and strength to be stretched optically flat over the beamsplitter mount and the film must retain enough elasticity to maintain its optical flatness over long periods of time even when coated. Although not possessing the lowest absorption coefficient among the polymers, Mylar meets these requirements and has the additional advantage of being readily available in suitable thicknesses as well as being a well studied substrate material for thin film coatings. Mylar has significant absorption especially in the range above 350 cm$^{-1}$ and an improvement in beamsplitter performance between 350 and 600 cm$^{-1}$ could be achieved by using a material of lower absorption such as polypropylene. Even below 350 cm$^{-1}$ the absorption of Mylar is greater than 10% for layers of thickness greater than approximately 10 μm.

The choices for high refractive index materials for coatings for far-infrared filters is limited. Possible materials include zinc sulfide (ZnS), germanium (Ge), and silicon (Si). However ZnS must be discarded since it has a very strong absorption (k=11.8) at 276 cm$^{-1}$ (Palik 1985)[1]. Crystalline silicon, often used for substrate for far-infrared interference filters, initially appeared promising since it has a very low extinction coefficient, and a nearly an ideal refractive index (2 times Mylar's) for manufacturing interference coatings in combination with Mylar. However, the deposited layers on Mylar were found to have properties more resembling those of amorphous silicon which is approximately 100 times more absorbing than crystalline silicon and, if hydrogenated, has a lower refractive index near 2.8. Furthermore, the adhesion of silicon to Mylar is poor and the film density is much lower than the bulk material. Germanium proved to be the best material of this group for our application. In previous work it was shown that the reactive index of amorphous germanium is similar to crystalline germanium and that the extinction coefficient is low enough (below 0.1) for our application in the far-infrared.

Preferably, the high index coating is overcoated with a thin layer of a suitable protective coating such as Al$_2$O$_3$ and SiO$_3$ of a thickness range of 20–60 nm. Al$_2$O$_3$ of a thickness of about 20 nm is preferred.

DETAILED DESCRIPTION OF THE PREFERRED EMBODIMENTS OF THE INVENTION

This invention involves the deposition of films of high refractive index material onto lower index polymer films to form a multilayer interference system. One basic goal is to obtain the simplest possible multilayer system which has an average refractive index closer to the ideal one for a 50—50 transmittance-reflectance, free-standing film at a given angle of incidence. However even a single layer of the ideal index would suffer from having a vanishingly small efficiency at particular frequencies and a more important goal is to reduce these Fabry-Perot effects in order that there be no zero's in beamsplitter efficiency within the spectral range of interest. For this reason, at least two layers are needed and we shall see that a simple, two layer system can give very good performance over a large spectral range. In fact to produce a beamsplitter which does not absorb significantly, we must keep the number of layers to a minimum due to the fact that thicknesses of interference layers must be large in the far-infrared and the absorbances of available materials for this range are also large. The approach that we will describe is to deposit a single high index layer on a thin film polymer layer.

Fabrication Methods

Figure 1:
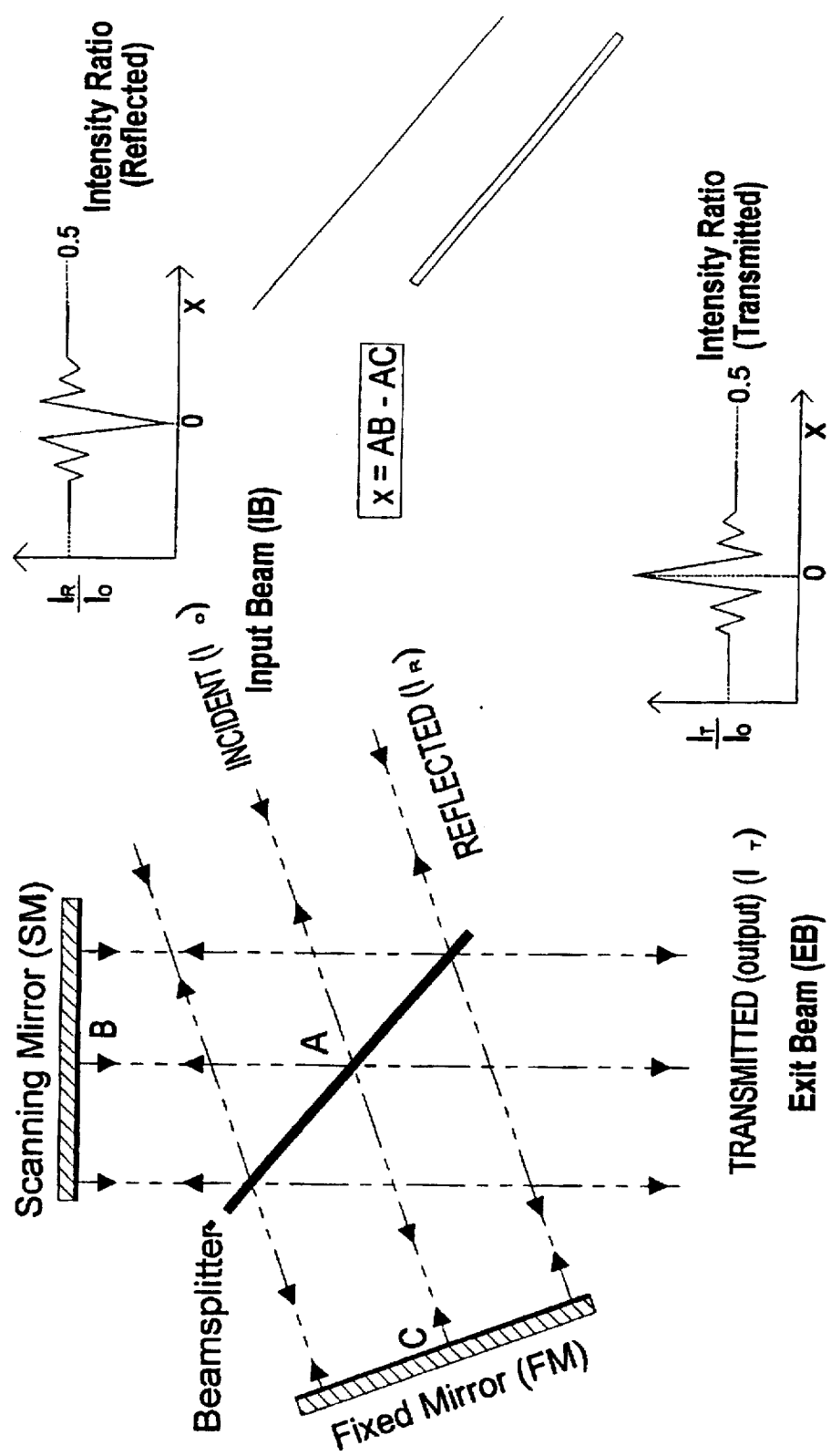
FIG. 1 is a perspective illustration of a Prior Art Interferometer of the Michelson-type.

As seen in FIG. 1, a conventional Michelson-type interferometer layout is illustrated, operating with the incident beam (IB) at 30° to the normal of the beamsplitter's (B) leading surface. The beamsplitter reflects and transmits the incident radiation to the fixed mirror (FM) and the scanning mirror (SM) which retroreflect the beams to the beamsplitter where interference occurs. the beam exiting the interferometer on transmission (EB) is normally directed to a detector (not shown) for measurement of the intensity modulation caused by scanning. In order to manufacture bilayer beamsplitters by vacuum deposition of the high index material (germanium) onto the low index substrate (Mylar), some criteria must be met by the substrate. Firstly the melting temperature of the substrate must be high enough so that the substrate survives the deposition. Mylar's melting temperature of 190° C. meets this condition. Secondly the substrate material must have substantially uniform thickness and optical constants over an area greater than the typical beamsplitter diameter (12 cm) as is the case for Mylar. This optical thickness was determined from the relative positions of the transmission maxima as measured in an infrared spectrophotometer from 20 to 1000 cm$^{-1}$. We have also determined the Mylar extinction coefficient by this method. Thirdly the substrate must remain substantially elastic after coating to allow optical flattening of the beamsplitter by stretching. We found that Mylar met this condition.

Electron-beam evaporation was used to produce 1 to 2 µm thick germanium films on 6 µm thick Mylar at base pressures in the range 0.2 to 0.7×10$^{-5}$ mbar and at deposition rates around 0.5 nm/s. Monitoring of the film thickness during deposition was not possible with the available near-infrared optical monitor which did not allow us to measure at a sufficiently large wavelength. Instead crystal quartz deposition rate monitor was used in situ and the total film thicknesses were measured after deposition using a Dektak profiler to calibrate the rate monitor. Although some non-uniformity of the layer across the 700 mm diameter coated area was observed the quality of the germanium films proved adequate. On a smaller lateral scale, cracking of the germanium film occurred in lines approximately every 1 cm. However this phenomena did not affect greatly the beamsplitter performance. To improve the density of the films and their adhesion, low energy argon ions were used in the deposition. A protective coating of 20 nm of Al$_2$O$_3$ applied to the germanium in the deposition chamber proved effective and did not affect the optical functioning of the beamsplitters.

When coating was complete and the coated material had cooled, it was removed from the coating plant and beamsplitters were constructed by mounting the material clamped between two stainless steel rings. At that point the beamsplitter membrane was somewhat slack and it was stretched tight by applying heat to the beamsplitter in this way reading the beamsplitter for testing.

Results

The test method used was to compare the performance of the coated beamsplitters with uncoated beamsplitters in actual use; i.e. in a commercial FT-IR spectrometer. The spectrometer used was a Bomen DA3 instrument which is evacuable and has far-infrared capability down to 5 cm$^{-1}$. Hence our bilayer beamsplitters were constructed in mounting rings compatible with this spectrometer. Since our goal was to have a single beamsplitter that functioned at least as well as the best bare Mylar beamsplitter at any frequency between 50 and 550 cm$^{-1}$, our procedure for testing was to measure the raw spectrum with our bilayer beamsplitter and compare it with the spectra for 3, 6, 12, and 25 μm Mylar beamsplitters with the same source and detector. These are the thicknesses of bare Mylar normally used to span this spectral range. With this method the size of the ordinate is proportional to the beamsplitter efficiency and, between two beamsplitters, the ratio of the raw ordinates equals the efficiency ratio. Such a comparison of beamsplitter performance is reasonable even with the non-negligible polarization of the radiation that occurs in the DA3 interferometer.

Figure 2:
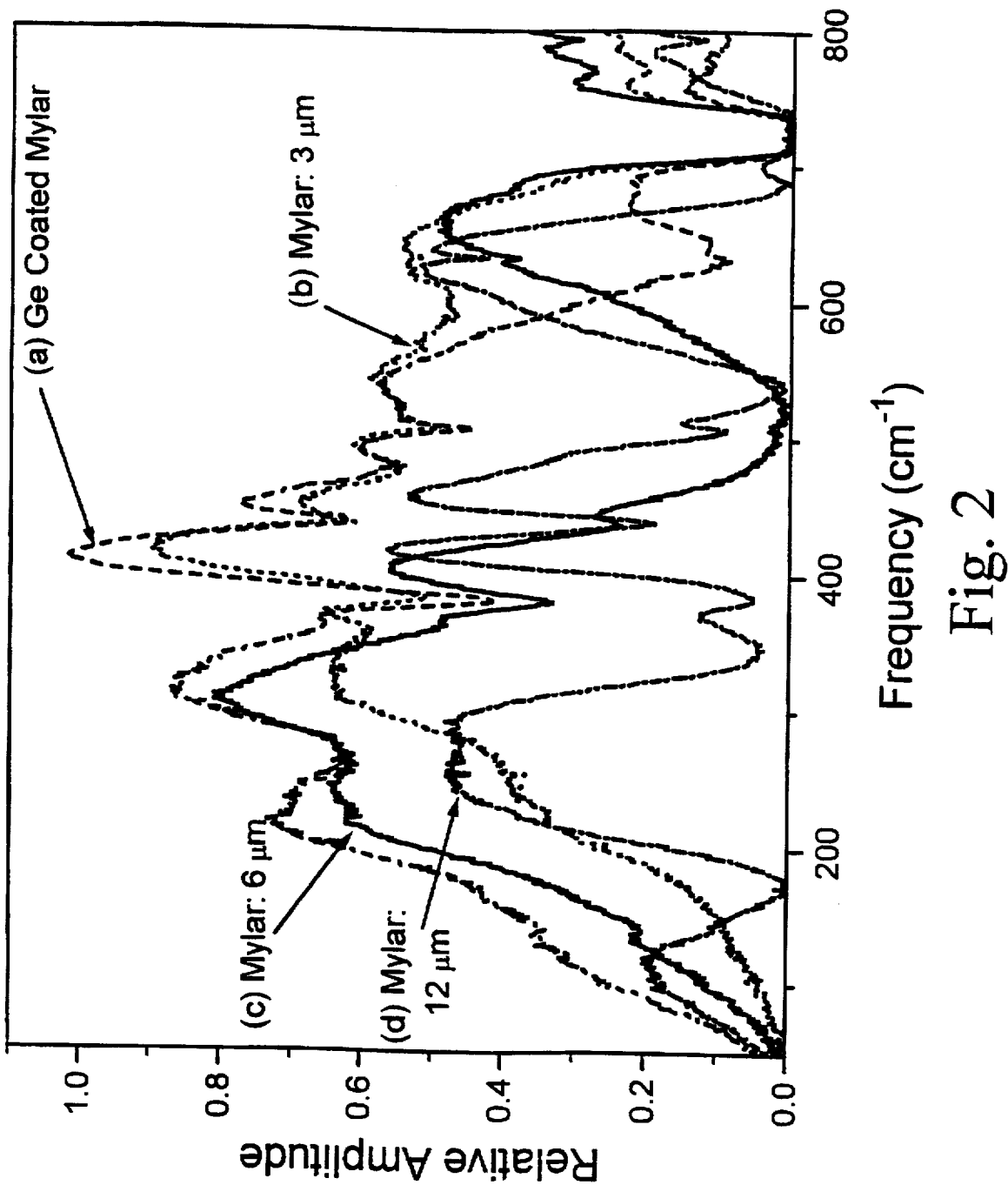
FIGS. 2, 3 and 5 are graphs illustrating the comparative performance of a bilayer beamsplitter according to the invention, comprising a 1.8 micron coating of germanium on a 6 micron Mylar film, single Mylar layers of various thicknesses.

In FIG. 2 we show the raw spectra taken with a DTGS detector for (a) a bilayer beamsplitter consisting of 1.8 μm of evaporated germanium on a 6 μm Mylar film, (b) a 3 μm Mylar beamsplitter, (c) a 6 μm Mylar beamsplitter, and (d) a 12 μm Mylar beamsplitter. The bilayer beamsplitter had a protective overcoating $Al_2O_3$ of thickness 20 nm. A Mylar thickness of about 6 μm was selected on the basis that its beamsplitting efficiency (as a single layer) is moderate over a wide far-IR spectral range. It will be appreciated by those skilled in the art that somewhat thicker or thinner layers will work, but not as efficiently. All of the spectra in this figure were taken under the same experimental conditions for the radiation source, instrumental aperture, resolution, scanning speed, and detector. Only the beamsplitter was changed between spectra and this change was done carefully to avoid misaligning the beamsplitter mount. From FIG. 2 we see that, except in a narrow range near 400 cm$^{-1}$ where the Mylar absorbs significantly (α~750 cm$^{-1}$), the bilayer beamsplitter meets our design objectives and performs better than any of the uncoated beamsplitters. From FIG. 2, it is apparent that the bilayer beamsplitter has a non-zero reflectance up to approximately 700 cm$^{-1}$ although the 3 μm beamsplitter has a higher efficiency for frequencies above approximately 560 cm$^{-1}$. Also, the bilayer beamsplitter has the highest efficiency at the lower end of the spectrum (50 cm$^{-1}$).

Figure 3:
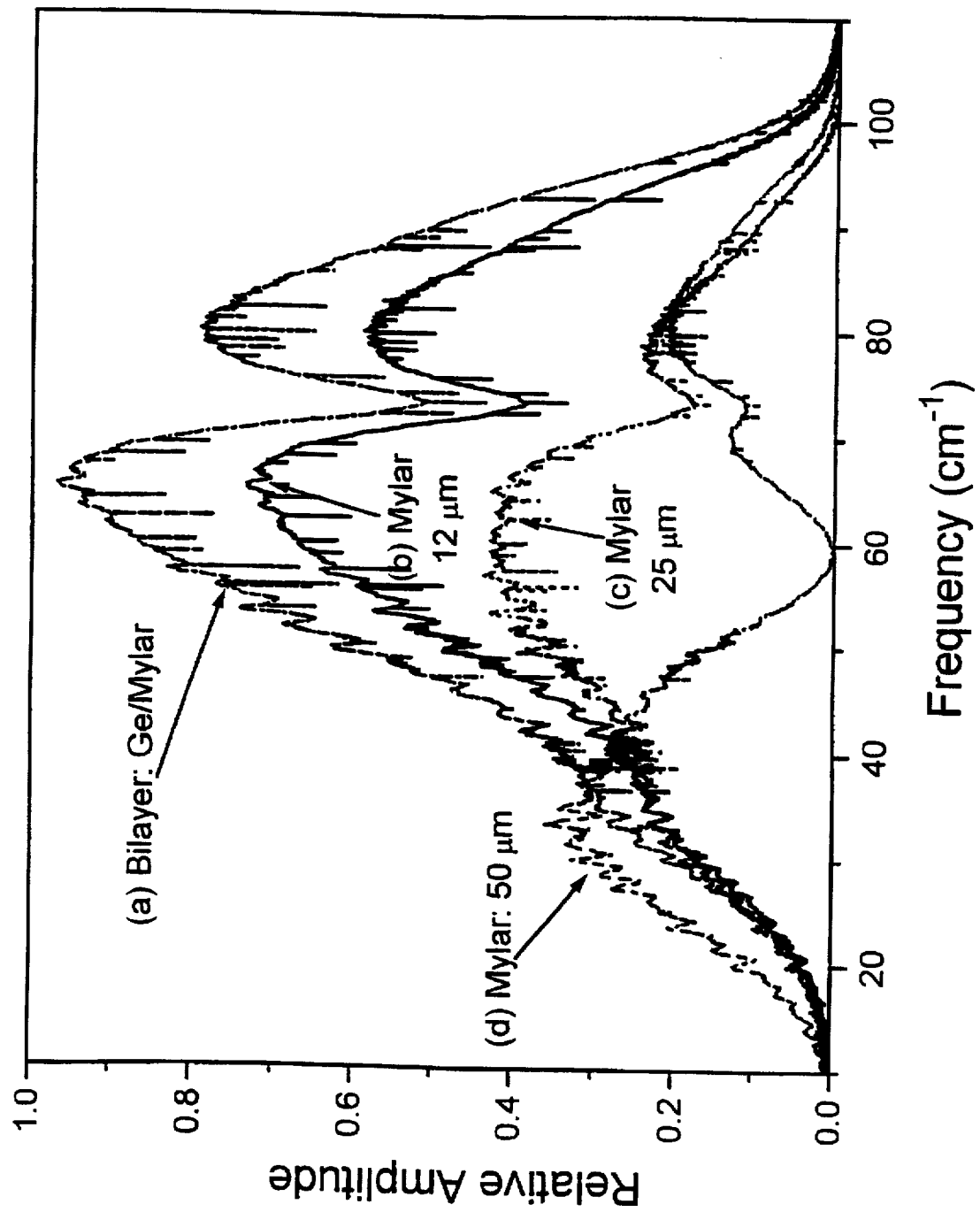

More details of the bilayer beamsplitter's low frequency performance are given in FIG. 3 where we show its spectrum (trace a) and the spectra for (b) 12 μm, (c) 25 μm, and (d) 50 μm bare Mylar beamsplitters. All these spectra were taken for a resolution of 0.02 cm$^{-1}$ with a mercury lamp source detected with a liquid helium (2K0 biolometer which was filtered to respond between 5 and 100 cm$^{-1}$. The sharp absorption lines in the spectrum were due to water vapor in the spectrometer which was evacuated to 0.5 T. The broad absorption feature near 70 cm$^{-1}$ came from the polyethylene base of the detector's cold filter. From these spectra we see that the bilayer beamsplitter divides the beam down to approximately 20 cm$^{-1}$ although the 50 μm bare Mylar is more efficient below 37 cm$^{-1}$.

The results in FIGS. 2 and 3 demonstrate that there is no reason to use a 6, 12, or 25 μm bare Mylar beamsplitter instead of the bilayer beamsplitter, instead quite the contrary. The 3 μm beamsplitter has questionable utility since it has higher efficiency than the bilayer beamsplitter only above 560 cm$^{-1}$ where, in any event, the standard coated-KBr beamsplitter are superior to all Mylar based beamsplitters. Below 37 cm$^{-1}$, the 50 μm Mylar beamsplitter should be used since it performs better than the bilayer beamsplitter. Above this frequency, however, the bilayer beamsplitter becomes rapidly much more efficient than the 50 μm beamsplitter.

We shall now show the effect on beamsplitter performance of varying the germanium (Ge) thickness. The optimum thickness for Ge deposited on 6 μm Mylar was determined theoretically to be 1.75±0.1 μm. Experimentally, this range was confirmed by depositing Ge films over a range of thickness from 1 to 2.1 μm and we present, here, the results for two Ge films of thicknesses 1.01 and 2.08 μm, both on a 6 μm Mylar pellicle. These results will show in a practical sense why a Ge thickness of approximately 1.75 μm provides best beamsplitter performance.

Figure 4:
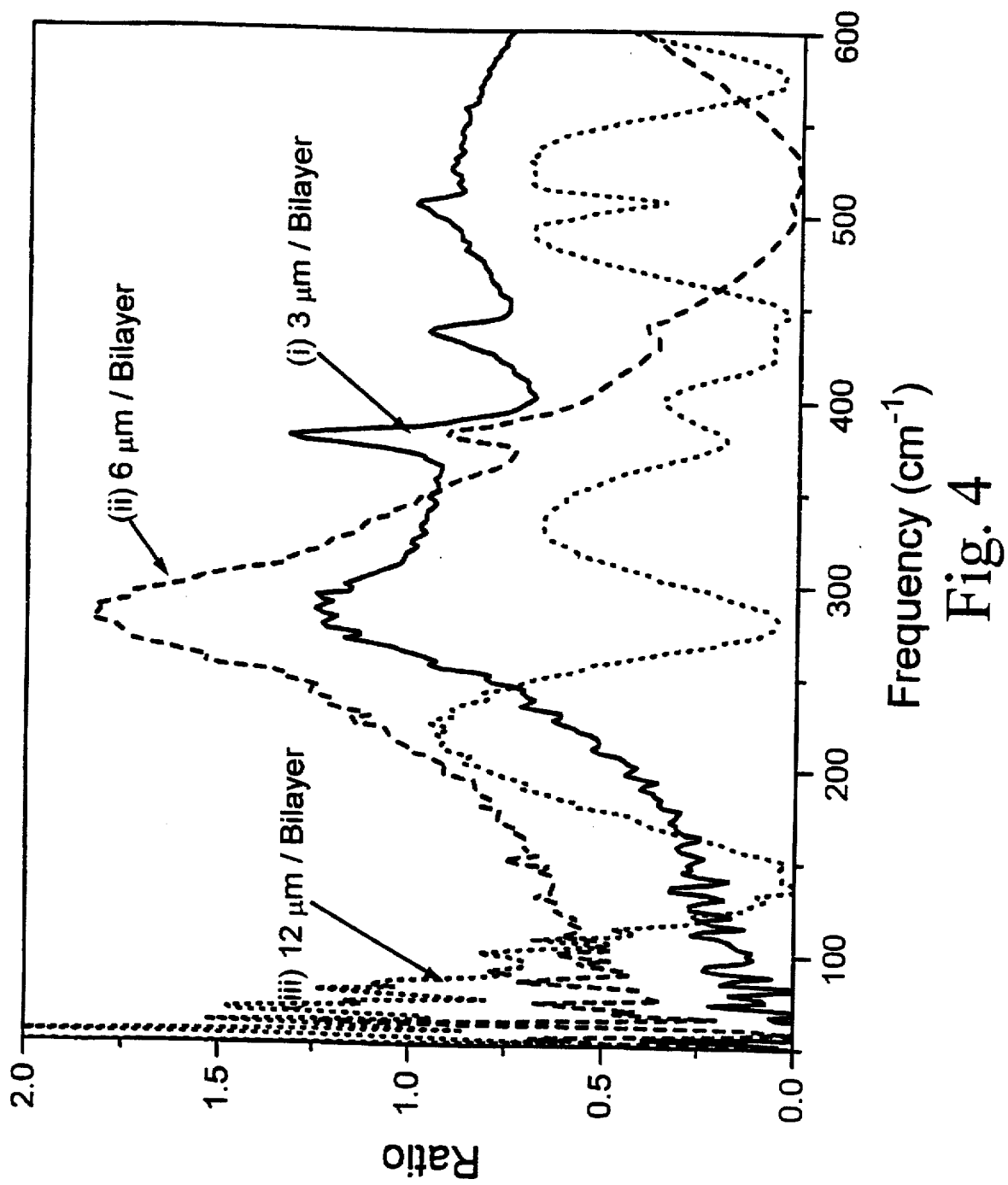
FIG. 4 is a graph illustrating the comparative performance of a 1.01 micron coating of germanium on a 6 micron Mylar film, to various thicknesses of bare Mylar films.
Figure 5:
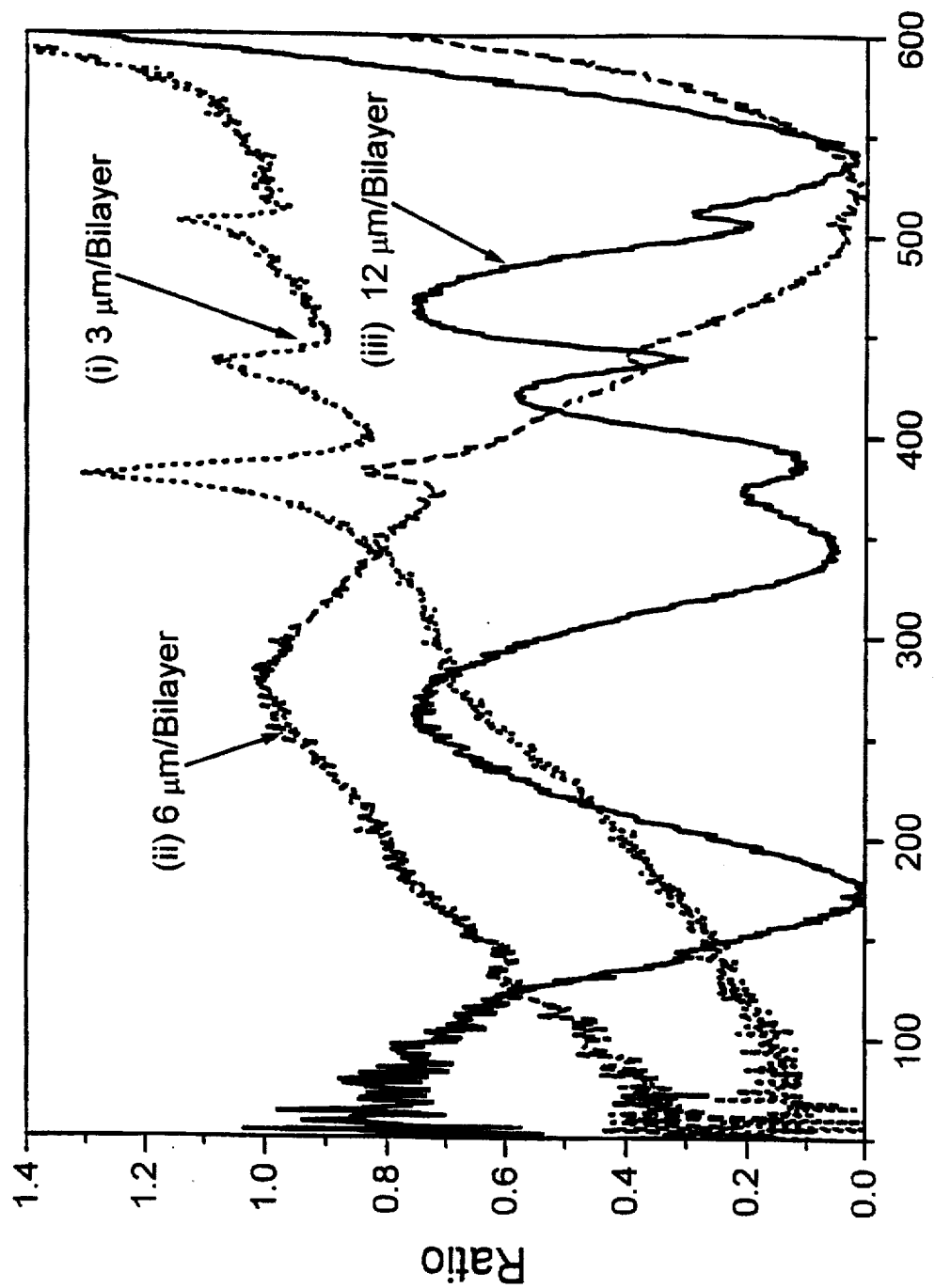

FIG. 4 shows the amplitude ratios for a bilayer beamsplitter with 1.01 μm on Ge on 6 μm of Mylar. In FIG. 5, these ratios are obtained by dividing the raw spectra for bare 3, 6, and 12 μm Mylar beamsplitters with the raw spectrum from the bilayer beamsplitter. As before, a ratio of less than unity indicates that the bilayer beamsplitter is performing better than the particular bare Mylar beamsplitter for which that ratio was obtained. As can be seen from FIG. 4 the bilayer beamsplitter of this Ge thickness has comparable performance to the 3 μm Mylar beamsplitter over the range 50 to 550 cm$^{-1}$. It also performs better than the 12 μm Mylar beamsplitter over this range. This bilayer beamsplitter has considerably lower efficiency than the 6 μm Mylar beamsplitter over a significant part of this range as can be seen from the peak in the ratio for this Mylar beamsplitter around 280 cm$^{-1}$. Nonetheless, this bilayer beamsplitter can be used over the whole range from 50 to 550 cm$^{-1}$ having a non-zero efficiency at all frequencies. The bilayer beamsplitter consisting of 1.8 μm of Ge on a 6 μm Mylar pellicle provides better overall performance over the whole of this range as can be seen by comparing FIGS. 4 and 5.

Figure 6:
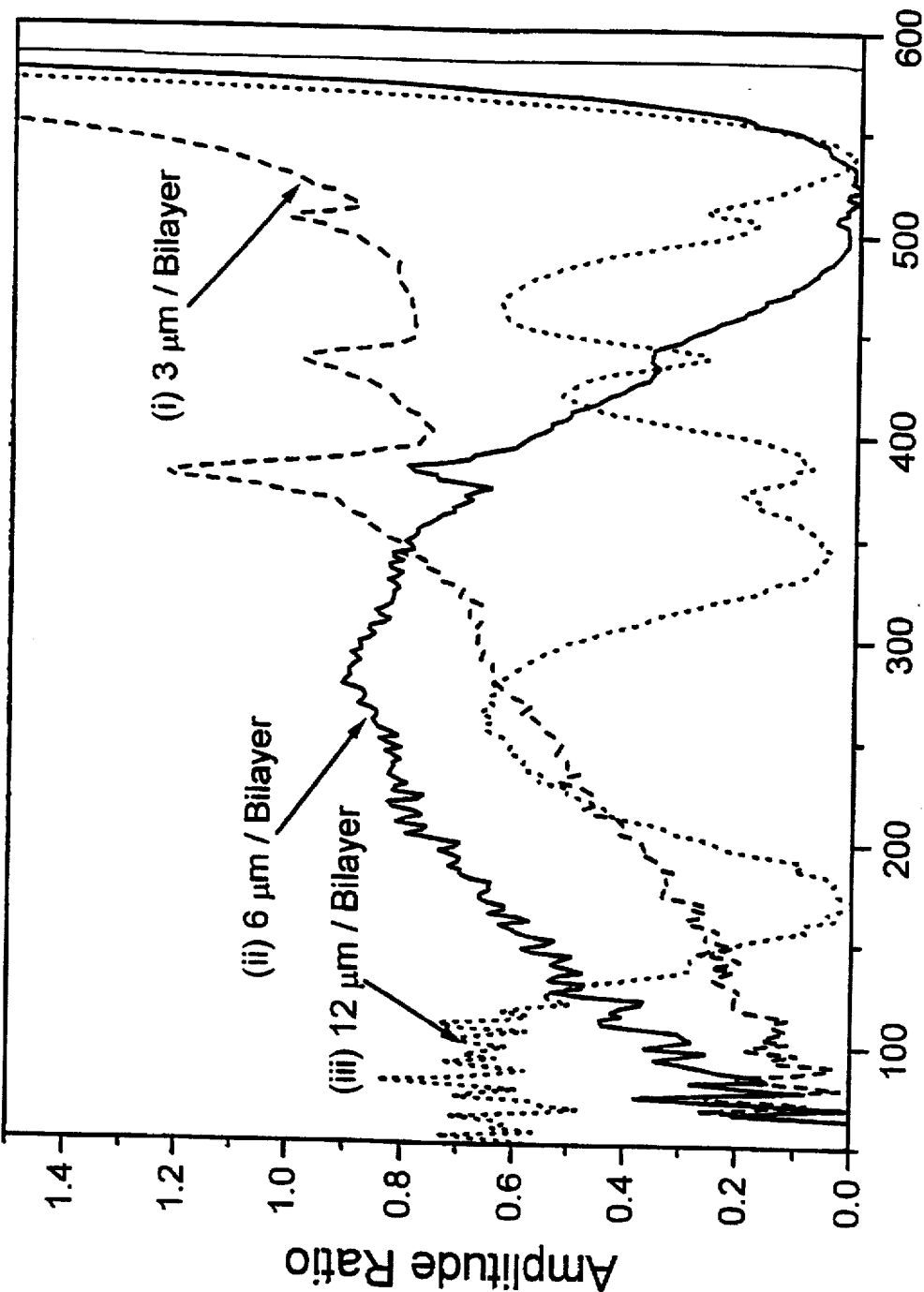
FIG. 6 is a graph illustrating the comparative performance of a 2.08 micron coating of germanium on a 6 micron Mylar film, to various thicknesses of bare Mylar films.

FIG. 5 depicts what occurs if the Ge layer in the bilayer beamsplitter is made thicker; i.e. 2.08 μm of Ge on 6 μm of Mylar. Basically, a very efficient beamsplitter was obtained but with the highest frequency for the beamsplitter reduced to less than 550 cm$^{-1}$, a situation that causes this beamsplitter to violate our design criteria. Comparing FIGS. 5 and 6, it can be seen that the bilayer beamsplitter with 2.08 μm of Ge actually is more efficient than the bilayer beamsplitter with 1.8 μm of germanium, but that the spectral range is reduced at the higher frequencies.

This demonstrates that we explored a range of Ge thicknesses from 1 to 2.1 μm for our bilayer beamsplitter when arriving at the optimum Ge thickness of 1.75 μm.

Discussion

We have demonstrated that it is possible to produce using thin-film deposition techniques a bilayer far-infrared beamsplitter for FT-IR spectrometers operating in the spectral range from 20 to 600 cm$^{-1}$. Various materials and fabrication methods have been investigated with the result that a cost-effective, large-volume technique has been found to produce the beamsplitters using equipment to be found in most thin-film laboratories. The bilayer beamsplitters demonstrated herein are clearly superior to the commercially available beamsplitters employing single Mylar layers both with regard to absolute beamsplitter efficiency and spectral range for frequencies from 37 to 550 cm$^{-1}$. In this spectral range, we have shown that one bilayer beamsplitter can replace four single-layer Mylar beamsplitters with better performance. The bilayer beamsplitter has proven to be stable over a period of months and, polarization effects with it are not drastic.

Polypropylene Substrate

The new polymer substrate material to be discussed is polypropylene of from 4 to 6 μm thickness on which a Ge film of thickness of 1 to 2 μm was deposited. These results will show in a practical sense why bilayer beamsplitters using polypropylene instead of Mylar exhibit beamsplitter efficiency far higher than single Mylar layers, and substantially greater than the similar bilayer devices previously reported employing Ge on Mylar.

The most significant advantage of polypropylene compared with Mylar is polypropylene's ultra-low absorption in the far-infrared (J. R. Birch, The Far-infrared Optical Constants of Polypropylene, PTFE and Polystyrene, Infrared Physics, 33, 33–38 (1992)). Polypropylene's absorption is at least an order of magnitude smaller than that of Mylar. Kampffmeyer et al[7] discussed the use of single polypropylene layers as beamsplitters in far-infrared Michelson interferometers for FT-IR spectrometry. These authors noted the relatively low efficiency of such single layer beamsplitters occurred as a result of the low real refractive index, n, of polypropylene compared other polymer materials such as Mylar.

In actual practice, an optimum beamsplitter design for operating between 50 and 600 cm$^{-1}$ using the commercially available polypropylene thickness, 6 µm proved similar to that for Mylar-based bilayer beamsplitters with a 6 µm Mylar substrate. The optimum Ge thickness for the polypropylene-substrate bilayer beamsplitter was 1.7 µm as compared with an optimum Ge thickness of 1.8 µm for Mylar-substrate beamsplitters.

The fabrication and test methods and conditions were similar to those previously discussed in respect of the Ge/Mylar beamsplitters.

Figure 7:
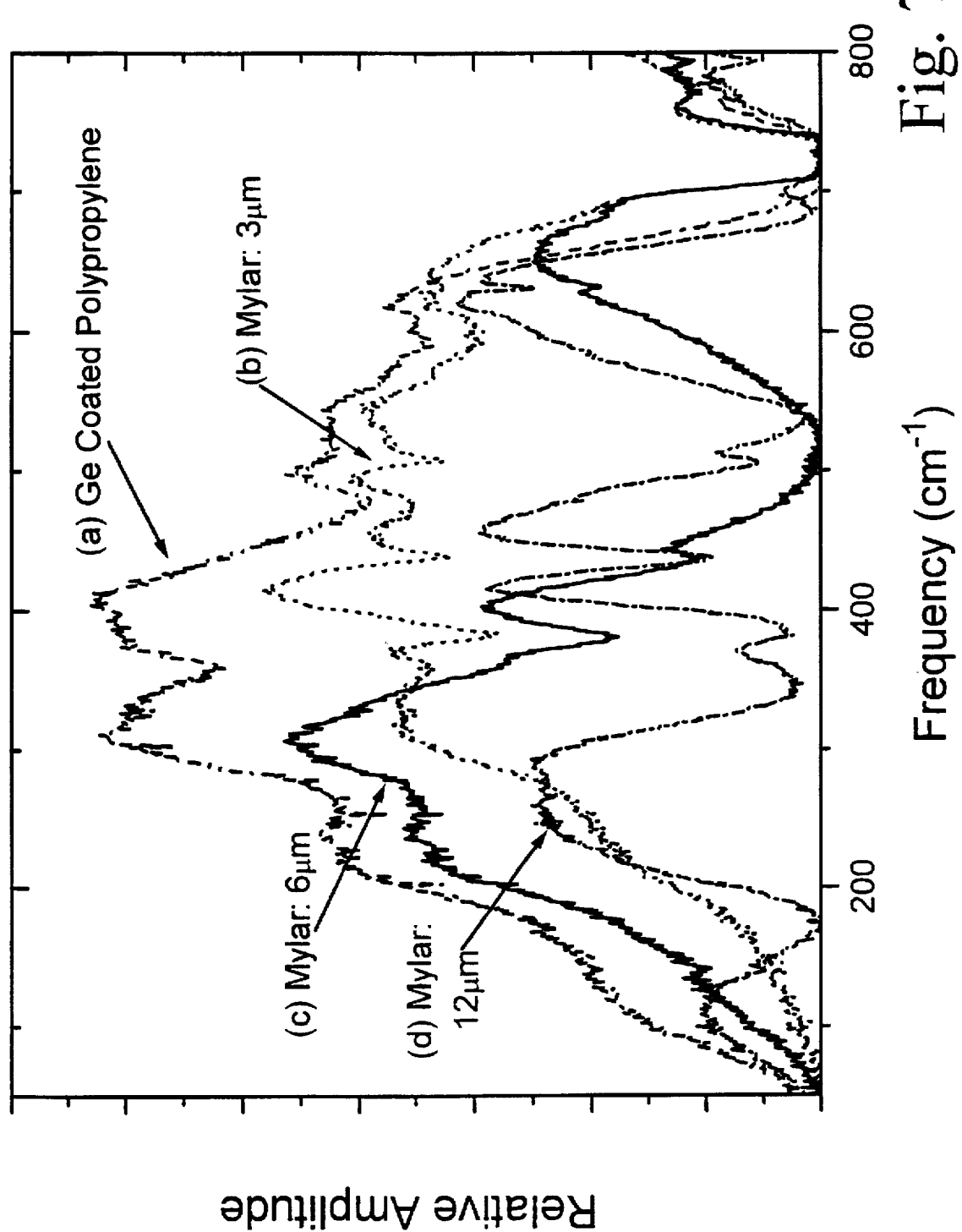
FIG. 7 is a raw spectra taken with a DTGS detector for (a) a bilayer beamsplitter consisting of 1.7 µm of evaporated germanium on a 6 µm polypropylene film, (b) a 3 µm Mylar beamsplitter, (c) a 6 µm Mylar beamsplitter, and (d) a 12 µm Mylar beamsplitter.

FIG. 7 is a presentation of the spectral results for Ge coated polypropylene (1.7 µm Ge on 6 µm polypropylene) and for single layer Mylar beamsplitters of varying thicknesses. All four spectra were taken in an evacuated FT-IR spectrometer and under the same experimental conditions with regard to radiation source, Jacquinot stop, scanning speed, spectral resolution, and detector. As the reader can see from FIG. 7, the polypropylene-substrate bilayer beamsplitter produces a higher amplitude spectrum throughout the range 50 to 600 cm$^{-1}$ than do the single layer beamsplitters. Thus this bilayer beamsplitter has higher efficiency at all points in this range than a single layer beamsplitter of arbitrary thickness. It can also be observed that the polypropylene-substrate bilayer beamsplitter has no observable molecular absorption bands in this range, as expected and unlike Mylar.

Figure 8A:
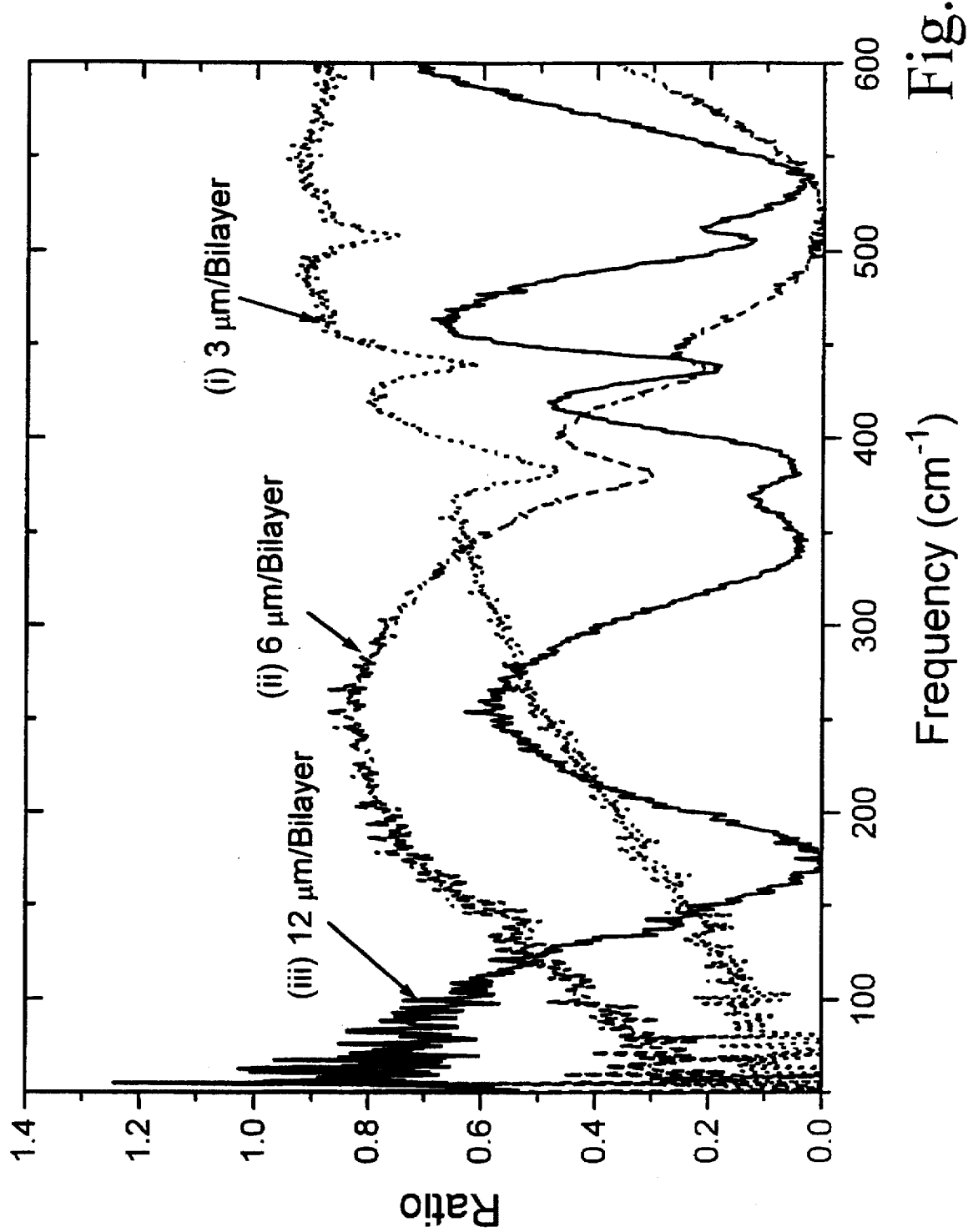
FIG. 8 is an (a) experimental and (b) theoretical beamsplitter performance ratios 50 to 600 cm$^{-1}$ for (i) 3 µm Mylar ratioed to the bilayer beamsplitter, (ii) 6 µm Mylar ratioed to the bilayer beamsplitter, and (iii) 12 µm Mylar ratioed to the bilayer beamsplitter. The bilayer beamsplitter consisted of 1.7 µm of germanium deposited on a 6 µm polypropylene substrate.
Figure 8B:
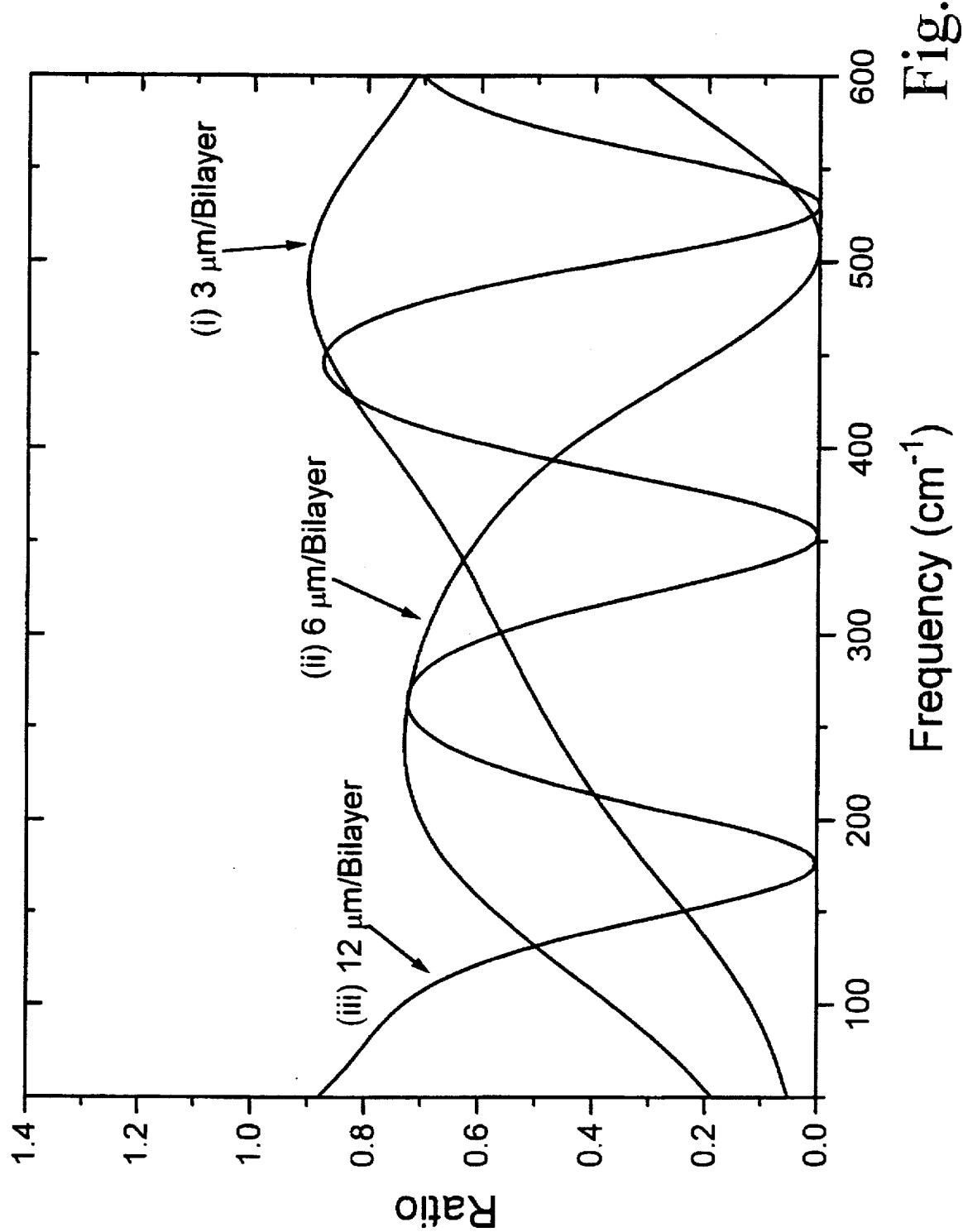

For comparison with theory, in FIG. 8 are plotted (a) the ratioed experimental data with (b) the theoretical ratios with zero absorption assumed. A ratio curve for a given single-layer Mylar thickness was obtained by dividing the measured spectrum or theoretical efficiency by the corresponding spectrum or efficiency for the coated beamsplitter (1.7 µm Ge on 6 µm polypropylene). As discussed previously, this procedure allows a comparison of experiment and theory without requiring an absolute spectrometer efficiency calibration. When Mylar absorptions are discounted, the correspondence between experiment and theory is very good below 550 cm$^{-1}$ suggesting the polypropylene-substrate bilayer beamsplitter has very low absorption and scatter and that near optimum beamsplitting performance between 50 and 550 cm$^{-1}$ has been achieved.

Figure 9:
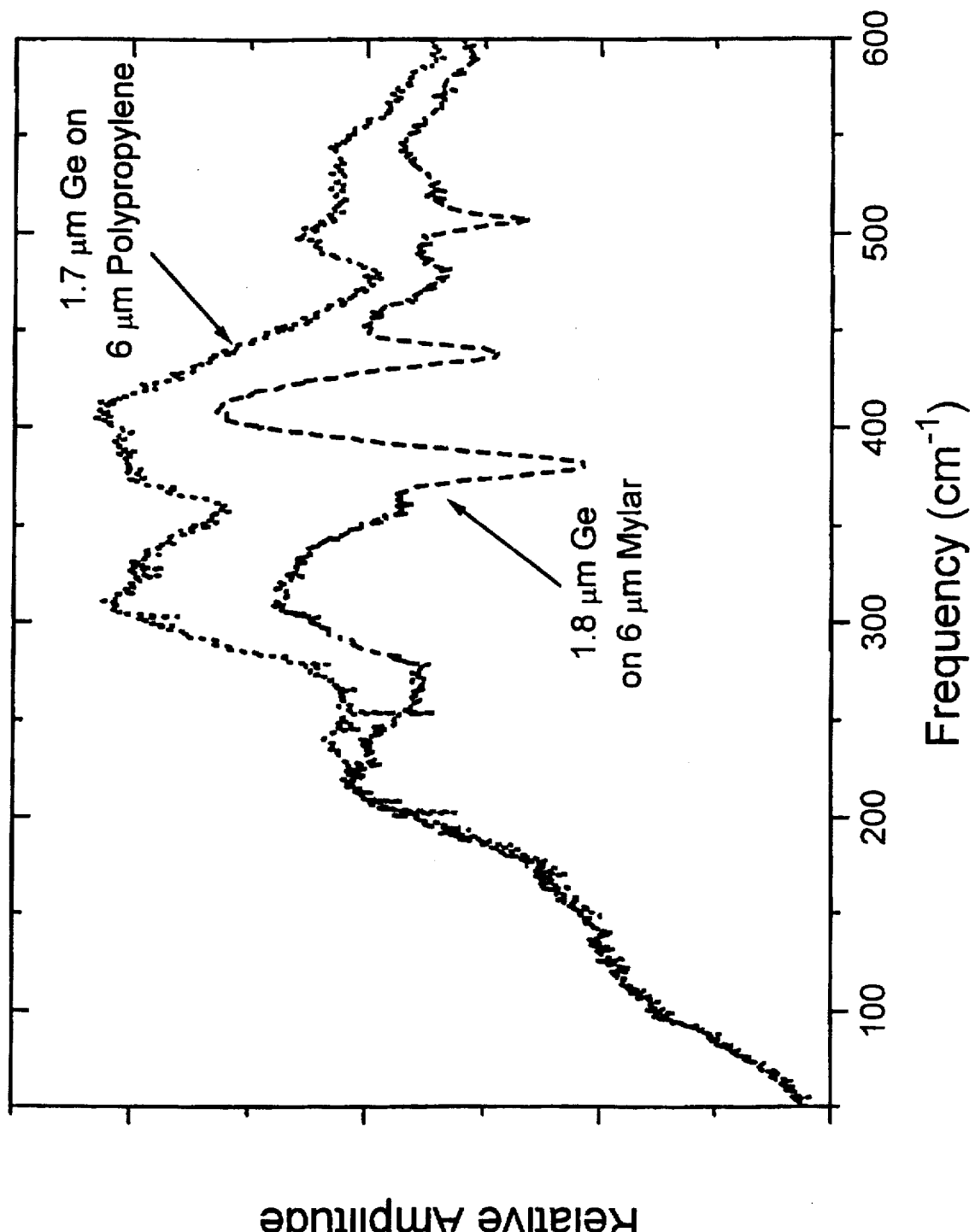
FIG. 9 is a spectra as measured for two bilayer beamsplitters consisting of 1.7 µm Ge on 6 µm polypropylene and 1.8 µm Ge on 6 µm Mylar. thick polypropylene substrate.

A comparison of the polypropylene-substrate bilayer beamsplitter with the Mylar-substrate bilayer beamsplitter was also conducted. The spectral data for such a comparison are shown in FIG. 9 where it can be seen that the polypropylene-substrate bilayer beamsplitter has equal or higher efficiency to the <<Mylar-substrate bilayer beamsplitter throughout the range 50 to 600 cm$^{-1}$. For determining the average beamsplitter efficiency using the 3 µm Mylar beamsplitter as a reference, we obtained an average efficiency for the polypropylene-substrate bilayer beamsplitter of 0.46 which is higher than allowed by theory, but not surprising since the method overestimates the average efficiency by approximately 0.01 because Mylar absorption was ignored in determining the theoretical efficiency curve for the 3 µm reference beamsplitter.

To evaluate the effect of coating thickness in the polypropylene-substrate bilayer beamsplitter, measurements were performed on bilayer beamsplitters with a range of Ge thicknesses between 1 and 2 µm on 6 µm thick polypropylene substrates. We shall give two more examples of such beamsplitters in the following discussion.

Figure 10A:
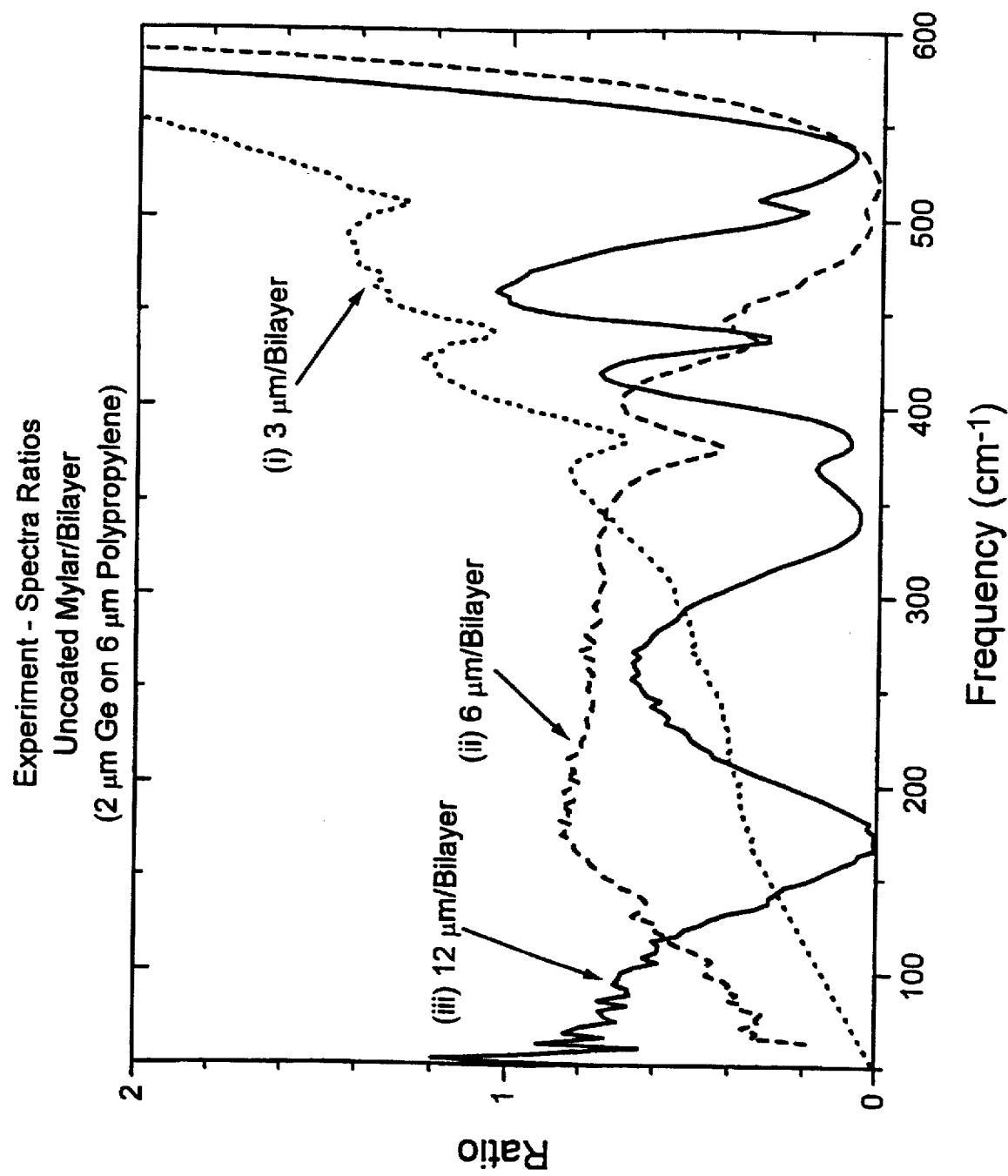
FIG. 10 (a) experimental and (b) theoretical beamsplitter performance ratios 50 to 600 cm$^{-1}$) for (i) 3 µm Mylar ratioed to a bilayer beamsplitter, (ii) 6 µm Mylar ratioed to the bilayer beamsplitter, and (iii) 12 µm Mylar ratioed to the bilayer beamsplitter. The bilayer beamsplitter consisted of a 2 µm thick Ge film deposited on a 6 µm thick polypropylene substrate.
Figure 10B:
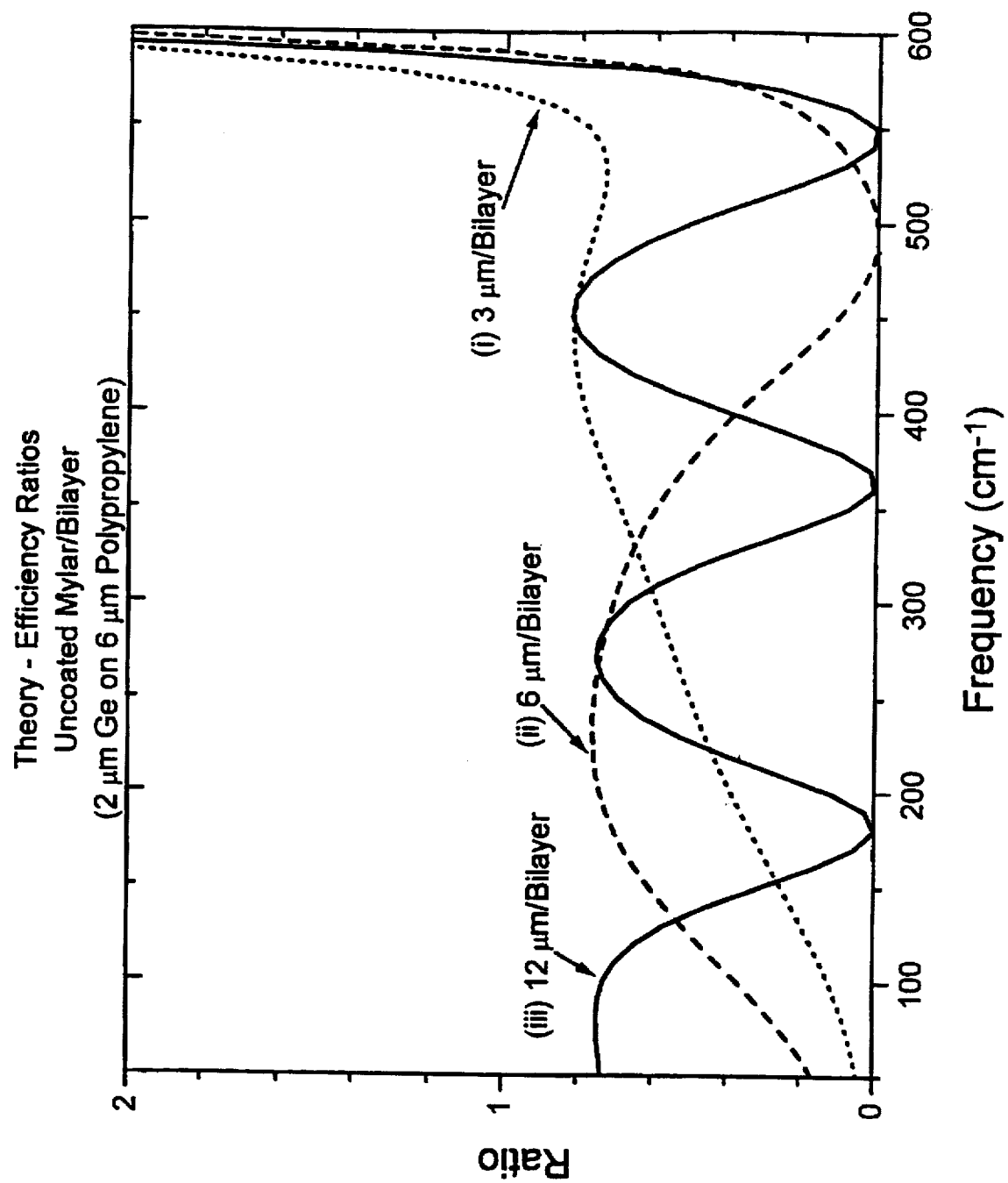

Results for 2 µm thick Ge on 6 µm thick polypropylene are given in FIG. 10 where (a) spectra ratio and (b) efficiency ratios between 3,6, and 12 µm thick uncoated Mylar and the polypropylene-substrate beamsplitters are plotted versus optical frequency. A general feature of this bilayer beamsplitter is that its material had a relatively large diffuse reflectance, i.e. optical scatter, due to poor surface quality which was observed to degrade more rapidly with increasing Ge thickness on a polypropylene substrate than on Mylar substrate. This scattering reduced the beamsplitter efficiency as seen in FIG. 10$a$ where the spectra ratios are larger than predicted by theory (FIG. 10$b$) especially at higher frequency where scattering increases relative to lower frequency. With this Ge thickness, the theory for the bilayer beamsplitter indicates that the reflectance goes to zero at approximately 580 cm$^{-1}$ where the theoretical ratio in FIG. 10$b$ is much larger than unity. This prediction is confirmed at least qualitatively in the spectra ratios of FIG. 10$a$. From these results it can be concluded that this bilayer beamsplitter is relatively more efficient at low frequencys (<350 cm$^{-1}$) but does not function well over complete the range from 50 to 600 cm$^{-1}$.

Figure 11A:
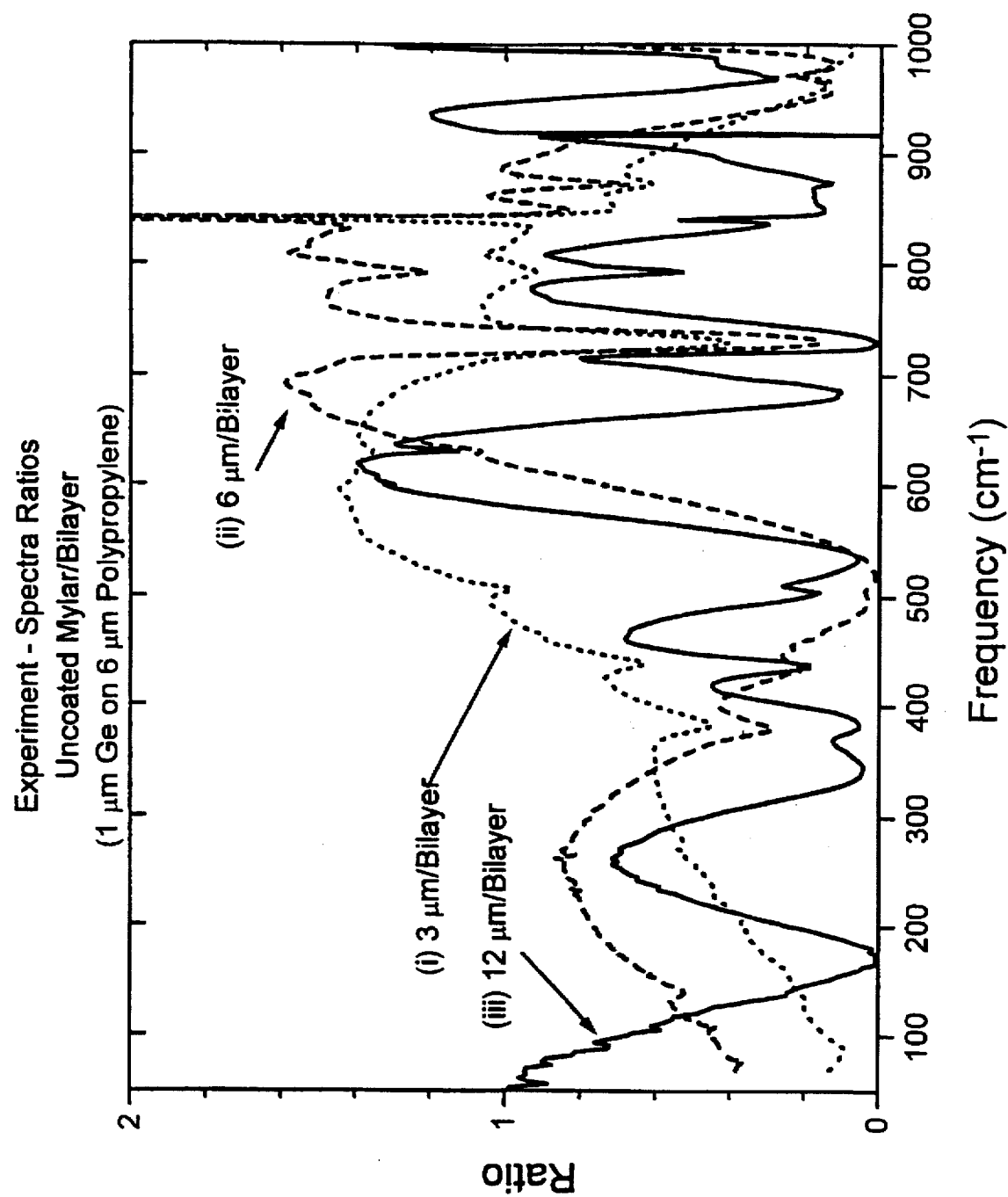
FIG. 11 (a) experimental and (b) theoretical beamsplitter performance ratios 50 to 1000 cm$^{-1}$) for (i) 3 µm Mylar ratioed to a bilayer beamsplitter, (ii) 6 µm Mylar ratioed to the bilayer beamsplitter, and (iii) 12 µm Mylar ratioed to the bilayer beamsplitter. The bilayer beamsplitter consisted of a 1 µm thick Ge film deposited on a 6 µm thick polypropylene substrate.
Figure 11B:
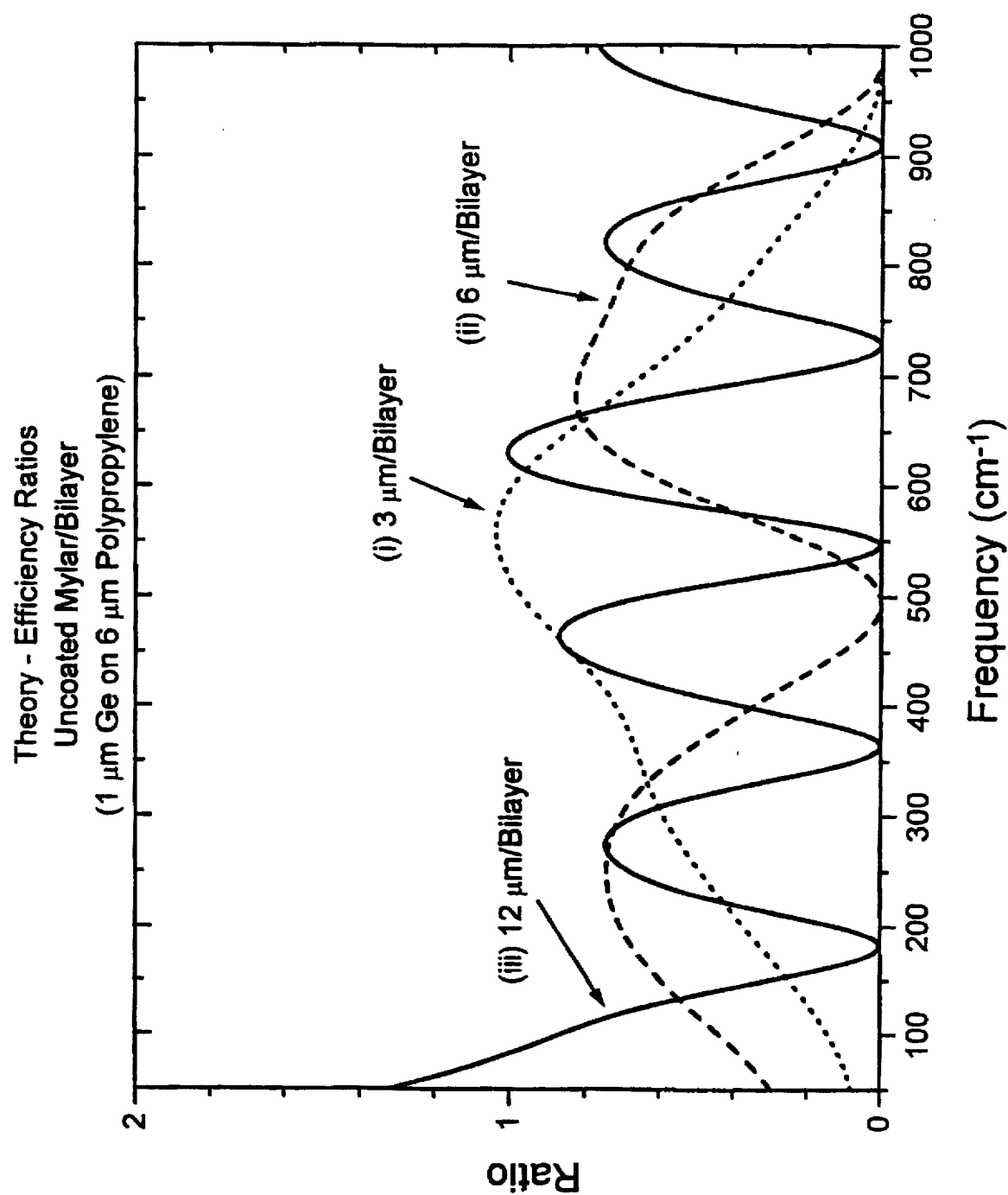

Experimental and theoretical results for a bilayer beamsplitter consisting of a 1 µm thick Ge layer on a 6 µm thick polypropylene substrate are shown in FIG. 11 where (a) spectra ratios and (b) efficiency ratios are plotted versus frequency from 50 to 1000 cm$^{-1}$. Having a thinner Ge layer this design provides a wider theoretical spectral range for the bilayer beamsplitter (50–1100 cm$^{-1}$) than the two polypropylene-substrate bilayer beamsplitters previously discussed although this device should have reduced efficiency at low frequency (<100 cm$^{-1}$) and lower peak efficiency in the middle of the frequency range. Nonetheless, as is apparent from the data in FIG. 11$a$, this bilayer beamsplitter has low absorption and no points of zero efficiency between 50 and 1000 cm$^{-1}$. (As explained previously, the efficiency or spectra ratios are greater than unity if the given Mylar beamsplitter gives better performance than the bilayer beamsplitter.) The largest polypropylene absorption appears as a line 4 cm$^{-1}$ wide centered at 840 cm$^{-1}$ in which range the beamsplitter efficiency dips by approximately 65%. However this absorption is not of extended range and the beamsplitter still functions adequately within the absorption line. Outside this range the beamsplitter efficiency is affected only slightly by minor narrow-band (<5 cm$^{-1}$ wide) absorptions in the polypropylene or Ge at 808 cm$^{-1}$ (8% reduction in beamsplitter efficiency), 972 cm$^{-1}$ (25% reduction), and 998 cm$^{-1}$ (25% reduction). Reducing the substrate thickness in this design would improve beamsplitter performance by (a) reducing substrate absorption effects and (b) increasing the bilayer efficiency between 500 and 700 cm$^{-1}$. A design employing a 4 µm thick polypropylene substrate in a bilayer beamsplitter will be discussed in the following paragraph.

A significant consequence of this invention, i.e. the polypropylene-substrate bilayer beamsplitter, is that the polypropylene as substrate in the beamsplitter allows the design and construction of high-efficiency bilayer beamsplitters for use at frequencies higher than is possible for Mylar-substrate beamsplitters. Such beamsplitters will be useful for applications in which wide spectral coverage is required and where it is not feasible to use crystalline beamsplitters, e.g. KBr or CsI, at higher frequency due operational or environmental constraints. For example, we have designed a high-efficiency polypropylene-substrate bilayer beamsplitter for a remote-sensing interferometer (Johnson et al. 1995)[9] to be used from 70 to 1000 cm$^{-1}$. The performance of this beamsplitter, consisting of a 1.0 µm thick Ge film on a 4 µm thick polypropylene substrate, will be discussed in the following. Mylar is as a substrate unsuitable in this configuration due to its relatively strong optical absorption at optical frequencies greater than 700 cm$^{-1}$.

Figure 12A:
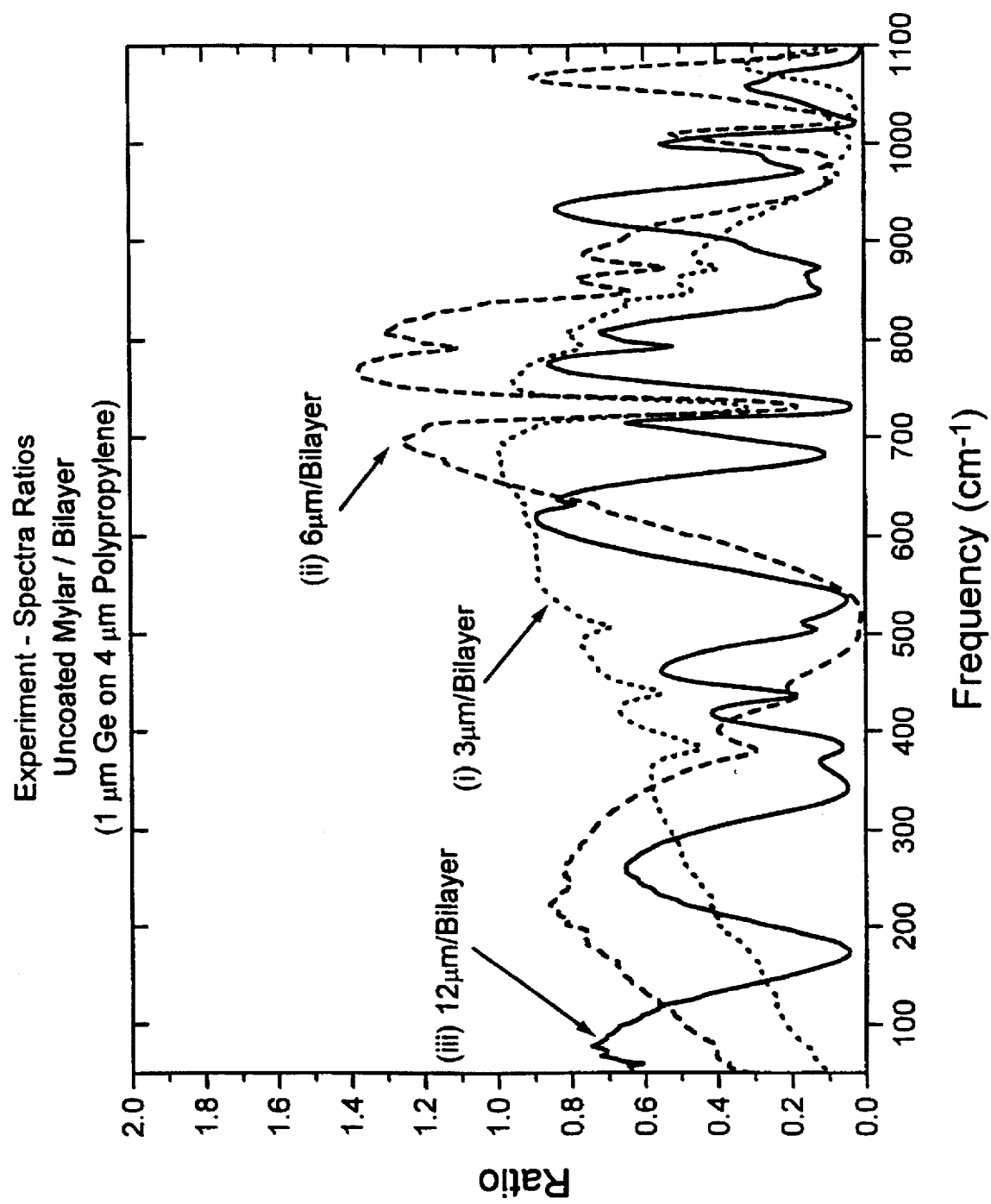
FIG. 12 (a) experimental and (b) theoretical beamsplitter performance ratios 50 to 1100 cm$^{-1}$) for (i) 3 µm Mylar ratioed to a bilayer beamsplitter, (ii) 6 µm Mylar ratioed to the bilayer beamsplitter, and (iii) 12 µm Mylar ratioed to the bilayer beamsplitter. The bilayer beamsplitter consisted of a 1 µm thick Ge film deposited on a 4 µm thick polypropylene substrate.
Figure 12B:
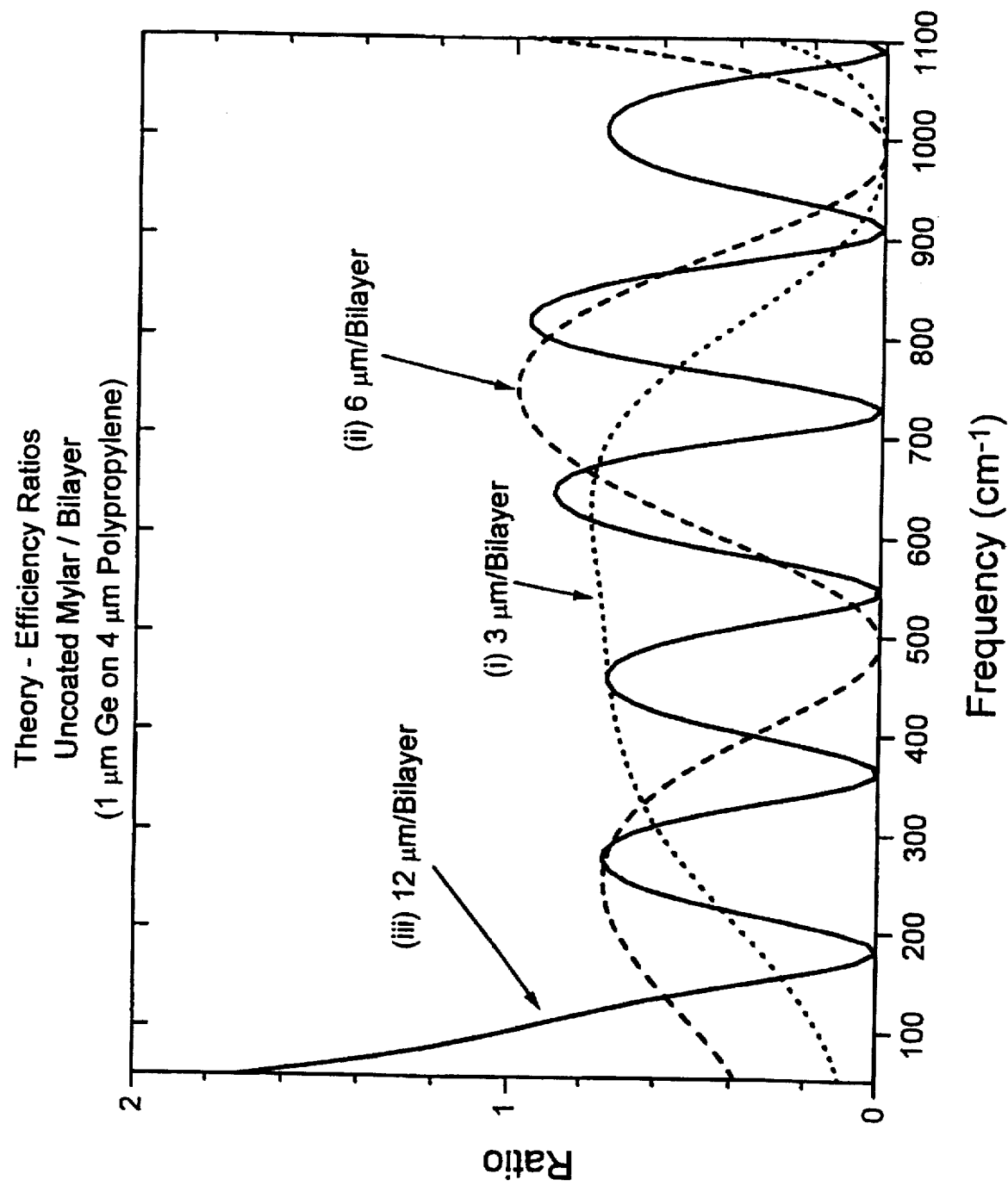

In FIG. 12 we show the experimental and theoretical curves for this beamsplitter where (a) spectra ratios and (b) efficiency ratios are plotted versus frequency from 50 to 1100 cm$^{-1}$ which includes the design range 70–1000 cm$^{-1}$. From the theoretical ratio (FIG. 12b) it is apparent that a beamsplitter of this design should have higher efficiency than the idealized (non-absorbing) Mylar beamsplitters over nearly the complete range except between 50 and 90 cm$^{-1}$ where the 12 µm Mylar is a maximum of 1.75 times as efficient. On average the bilayer beamsplitter is predicted to be 2.2 times as efficient as the 3 µm Mylar beamsplitter, 2.1 times as efficient as the 6 µm Mylar, and 1.8 times as efficient as the 12 µm Mylar. Furthermore as can be seen from FIG. 21b, this bilayer beamsplitter is predicted to have a non-zero efficiency over this whole range. The experimental ratios of spectra are shown in FIG. 12a where we see the theoretical predictions are generally confirmed when one allows for absorption in the Mylar films. As discussed previously we observe increased beamsplitter efficiency near 700 cm$^{-1}$ when using a thinner polypropylene substrate which is also responsible for reduced polypropylene absorption lines.

Figure 13:
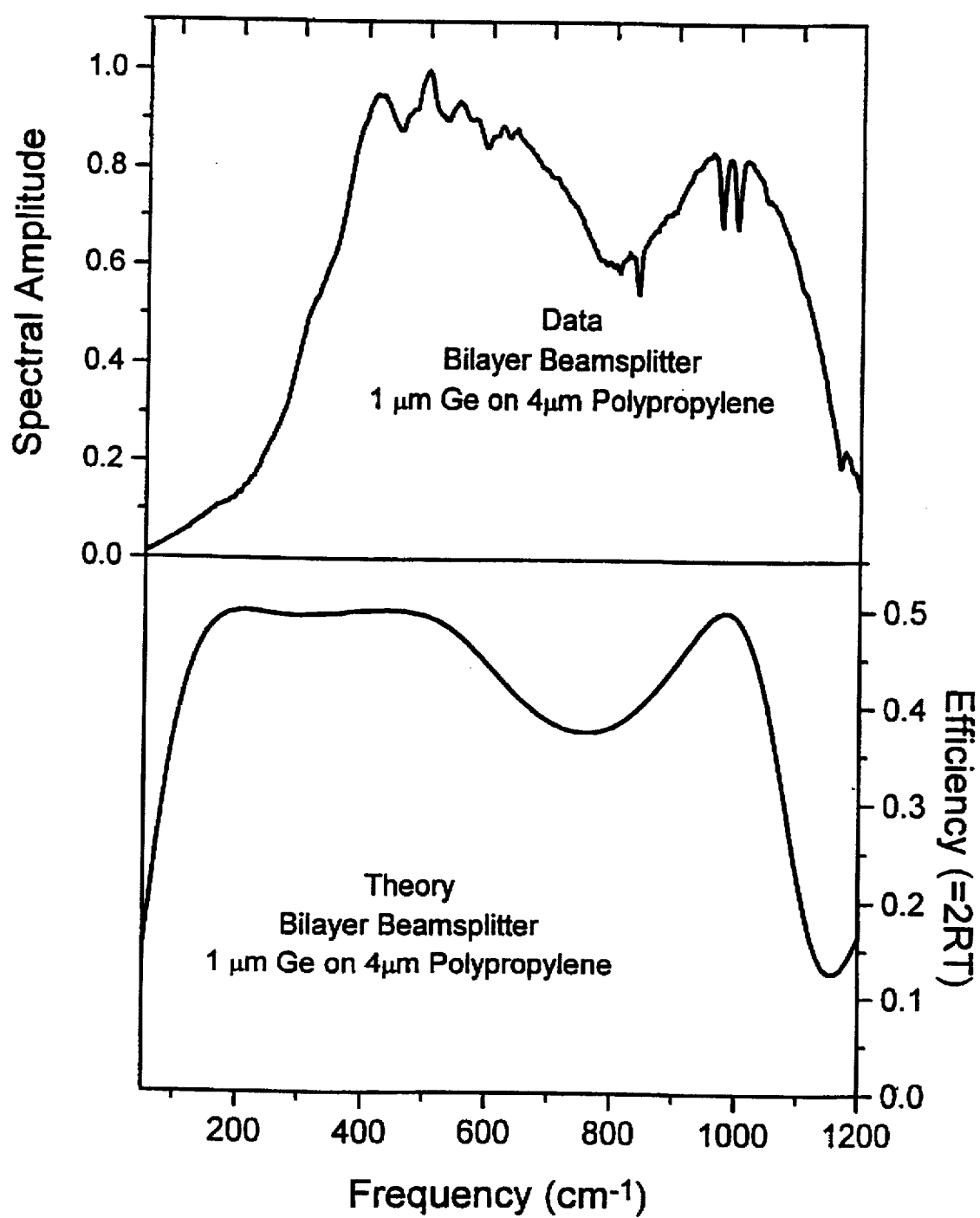
FIG. 13 unprocessed FT-IR spectrum (upper panel) from 50 to 1200 cm$^{-1}$ for a bilayer beamsplitter consisting of a 1 µm thick Ge film deposited on a 4 µm thick polypropylene substrate mounted in a spectrometer with globar source and pyroelectric detectors. Theoretical beamsplitter efficiency (lower panel) versus frequency for the same bilayer beamsplitter.

To demonstrate further the performance of this bilayer beamsplitter we plot in FIG. 13 the actual unratioed FT-IR spectrum from 50 to 1200 cm$^{-1}$ for this beamsplitter with a globar source and pyroelectric detectors. This spectrum does not go to zero anywhere in this range although it decreases at lower frequency not from a decline beamsplitter efficiency but mainly due to decreasing source irradiance at low frequency. The polypropylene absorption lines at 840, 940, and 998 cm$^{-1}$ do not affect significantly the performance of this device. A minimum in the spectrum is observed near 800 cm$^{-1}$ due to a corresponding minimum in reflectance as expected from the theory shown in the lower panel of this figure.

We have thus described a totally new and non-obvious beamsplitter, i.e. a polypropylene-substrate bilayer beamsplitter, which can be realized with very low absorption loss and near theoretical efficiency. We have demonstrated by actual practice that this beamsplitter functions very well in the range 50 to 600 cm$^{-1}$, and with appropriate Ge-layer and polypropylene thicknesses, will operate efficiently at least as high as 1000 cm$^{-1}$. This beamsplitter represents a significant advance in the state of the art for far-infrared beamsplitters employed in Fourier transform infrared spectrometers.

We have also found that the polypropylene as substrate in the beamsplitter allows the design and construction of high-efficiency bilayer beamsplitters for use at frequencies higher than is possible for Mylar-substrate beamsplitters. For example, we have designed a high-efficiency polypropylene-substrate bilayer beamsplitter for a balloon-born remote-sensing interferometer which will be used from 70 to 1000 cm$^{-1}$. This beamsplitter consists of a 1.1 micron thick Germanium film on a 4 micron thick polypropylene substrate. Mylar would not work in this configuration, due to its prohibitively strong optical absorption in the range of optical frequencies above 700 cm$^{-1}$.

It will be appreciated by those skilled in the art that from the extensive data presented herein with Mylar substrates, and in view of our demonstration that the performance of a polypropylene substrate beamsplitter is similar (but better) than a comparable Mylar substrate beamsplitter, one can predict with a high degree of confidence how a germanium/polypropylene beamsplitter would perform over a wide range of germanium and polypropylene thicknesses.

REFERENCES

1. E. D. Palik, Handbook of Optical Constants I (Academic Press, Orlando, Fla., 1985).
2. M. Cuisenier, A. Marten, and J. Mondellini, "Interférometres de Fourier dans l'infrarouge lointain et le sub-millimétrique. Etude comparative de leurs performances en rue d'applications spatioles", J. Optics (Paris), 23, 179–198 (1992).
3. D. H. Martin, "Polarizing (Martin-Puplett) interferometric spectrometers for near- and submillimeter spectra", Chapter 2 of Volume 6 of Infrared and Millimeter Waves: Systems and Components edited by K. J. Button, Academic Press, New York (1982).
4. M. J. Dignam and M. D. Baker, "Analysis of a polarizing Michelson interferometer for dual beam Fourier transform infrared, circular dichroism infrared, and reflectance ellipsometric infrared spectroscopies", Applied Spectroscopy, 35, 186–193 (1981).
5. B. Carli, M. Carlotti, F. Mencaraglia, and E. Rossi, "Far-infrared high-resolution Fourier transform spectrometer", Applied Optics, 26, 3818–3822 (1987).
6. A. E. Martin, "Infrared interferometric spectrometers", Volume 8 of Vibrational Spectra and Structure edited by J. R. Durig, Elsevier Scientific Publishing Company, Amsterdam (1980).
7. G. Kampffmeyer and A. Pfeil, "Self-supporting thin-film beamsplitter for far-infrared interferometers", Applied Physics, 14, 313–317 (1977).
8. H. A. Gebbie and G. A. Vanasse, Nature, 178, 432 (1956).
9. D. G. Johnson, K. W. Jucks, W. A. Traub, and K. V. Chance, "Smithsonian stratospheric far-infrared spectrometer and data reduction system", Journal of Geophysical Research, 100, 3091–3106 (1995).

We claim:

1. An interferometer comprising a source of infrared radiation, a fixed reflector, a moving reflector, and a beamsplitter for directing incident infrared radiation to said reflectors and recombining reflected radiation from said mirrors to produce a single transmitted output beam, wherein said beamsplitter comprises a composite consisting essentially of a substrate in the form of a thin, substantially uniformly thick film selected from the group consisting of polyethylene terephthalate and polypropylene and a substantially uniform thickness coating of the element germanium, the coating thickness being 1 to 2.1 microns, said composite having substantially optically flat leading and trailing surfaces.

2. An interferometer according to claim 1, wherein the substrate is of polyethylene terephthalate.

3. An interferometer according to claim 2, wherein the thickness of the substrate is about 6 microns.

4. An interferometer according to claim 3, wherein the thickness of the germanium coating is about 1.8 microns.

5. An interferometer according to claim 4, the composite additionally comprising an overcoating of a material selected from the group consisting of $SiO_2$ and $Al_2O_3$ of a thickness of 20–60 nm.

6. An interferometer according to claim 1, wherein the substrate is of polypropylene.

7. An interferometer according to claim 6, wherein the thickness of the substrate is 4 to 6 microns.

8. An interferometer according to claim 7, wherein the thickness of the substrate is about 6 microns.

9. An interferometer according to claim 8, wherein the thickness of the germanium coating is 1 to 2 microns.

10. An interferometer according to claim 9, wherein the thickness of the germanium coating is about 1.7 microns.

11. An interferometer according to claim 10, the composite additionally comprising an overcoating of a material selected from the group consisting of $SiO_2$ and $Al_2O_3$ of a thickness of 20–60 nm.

12. An interferometer according to claim 6, wherein the thickness of the substrate is about 4 microns, and the thickness of the germanium coating is about 1.1 microns.

* * * * *